Dec. 6, 1960 D. N. HUGHES 2,962,896
TEST FIXTURE FOR CENTRIFUGES
Filed March 26, 1956 2 Sheets-Sheet 1
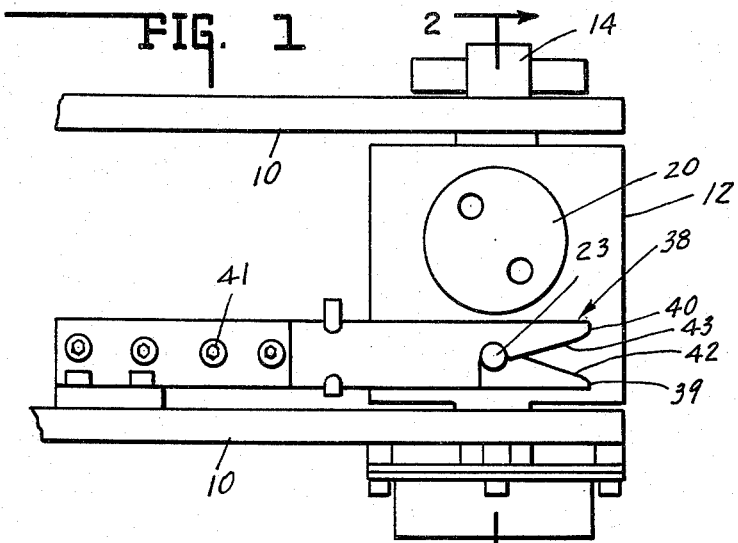
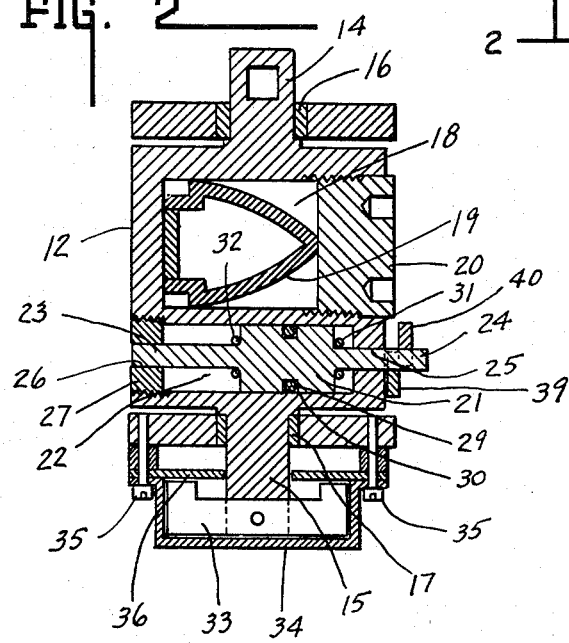
INVENTOR.
DONALD N. HUGHES.
BY Lockwood, Galt, Woodard & Smith.
ATTORNEYS

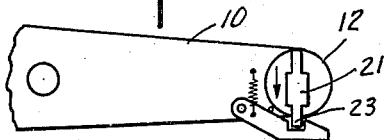
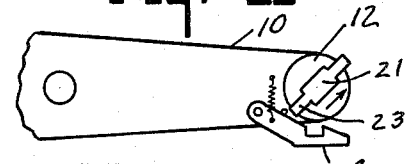
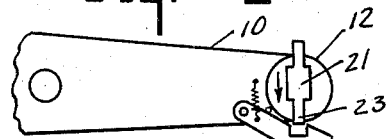
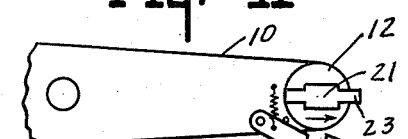
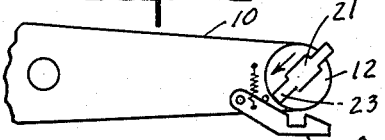
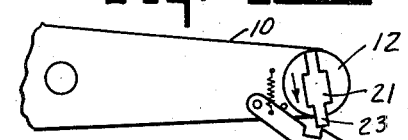
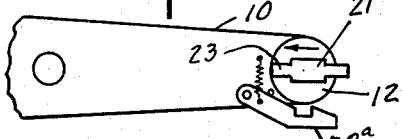
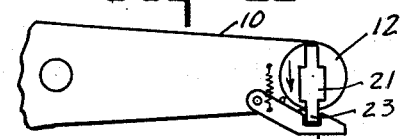
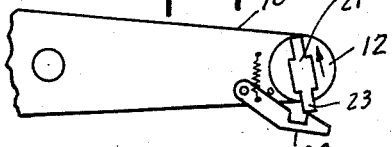
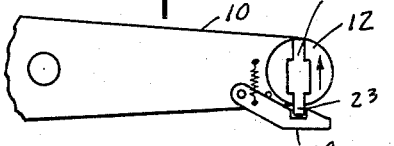
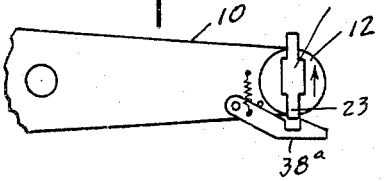

United States Patent Office 2,962,896
Patented Dec. 6, 1960

2,962,896

TEST FIXTURE FOR CENTRIFUGES

Donald N. Hughes, Defiance, Ohio, assignor to The Magnavox Company, Fort Wayne, Ind., a corporation Filed Mar. 26, 1956, Ser. No. 573,753

5 Claims. (Cl. 73—167)

This invention relates generally to testing devices and more particularly it relates to an accessory testing fixture for a centrifuge.

The prior art includes various types of fixtures adapted to hold a part for testing in a centrifuge. Such fixtures permit the application of forces in only one direction with respect to the part being tested. If it is desired to apply forces in one or more different directions with respect to the part being tested, it is necessary to stop the centrifuge, reposition the part being tested and again run the centrifuge through another test cycle.

Accordingly, the principal object of this invention is to provide an accessory testing fixture for a centrifuge having structure adapted to move a part being tested from one position into another automatically in response to acceleration or deceleration of the centrifuge, thereby to impress test forces in different directions on said part.

Another object of this invention is to provide an accessory test fixture for a centrifuge which is particularly adapted to cooperate with a centrifuge for simulating forces created in rocket flight on various parts of a rocket including the fuse structure.

In accordance with this invention, there is provided an accessory test fixture for a centrifuge comprising a body portion adapted to support a device for testing, a means responsive to acceleration and deceleration of the centrifuge for indexing said body portion through predetermined angles, whereby successive operational cycles of said centrifuge may cause applications of force in different directions to said device being tested.

The full nature of the invention will be understood from the accompanying drawings and the following description and claims.

Fig. 1 is a side elevation view of the accessory test fixture as provided in accordance with this invention;

Fig. 2 is a cross sectional view taken on line 2—2 of Fig. 1; and

Figs. 3 to 13 are schematic diagrams illustrating the successive phases of operation of the fixture illustrated in Figs. 1 and 2.

Referring to the drawings, this invention is adapted to be mounted on arms 10 of a centrifuge (not shown). It will be understood that the ends of arms 10 rotate about a rotating shaft of the centrifuge, whereby centrifugal forces are created in a longitudinal direction with respect to arms 10.

The invention comprises a body member 12, having extensions 14 and 15 which serve as shafts supported in journals 16 and 17 mounted in the outer ends of arms 10, as shown in Figs. 1 and 2. The body member 12 may be bored as at 18 to provide a space within which a device such as a fuse 19 may be supported for testing. A plug member 20 may be threaded into the open end of the chamber 18 to close this chamber and engage the device 19 for holding it in a fixed position.

In order to provide automatic indexing of the body portion 12 in response to acceleration or deceleration of the centrifuge, a movable weight 21 may be supported within a bore 22 in the body member 12. The weight 21 includes extensions or bolts 24 and 23 which project through a hole 25 in the outer wall of body member 12 and a hole 26 in a guide member 27 threaded into the open end of bore 22. In order to provide pneumatic damping of the movement of weight 21, a sealing ring 29 may be mounted within a circular slot 30 formed in the periphery of the weight 21. Ring 29 may be of such size as to provide sealing engagement with the wall of the bore 22. It will be readily understood that ring 29 will cause a certain amount of pressure or vacuum between the end walls of bore 22 and the ends of weight 21, thereby to damp the oscillation of weight 21.

A pair of rubber rings 31 and 32 or rings of other flexible materials may be mounted over the bolts 23 and 24 to prevent excessive shock forces between weight 21 and the end walls of bore 22.

In order to damp the rotative motion of the body member 12, a vane 33 may be fastened to the outer end of shaft member 15 and a casing 34 may be secured to one of the arms 10 by means of machine screws 35 to contain a viscous fluid adapted to damp the rotation of the vane 33 and therewith the rotation of body member 12. Casing 34 may be closed on its inner side by means of a washer 36.

To position the body member 12 at the beginning and end of each test cycle, there is provided a pair of latch members 38 on one side of one of the arms 10. Each latch member 38 comprises a pair of tongues 39 and 40 which are pivotally mounted, as at 41, so that they may pivot in opposite directions to permit entrance of bolt 23, for example, between the jaw portions 42 and 43 of tongues 39 and 40, respectively. Tongues 39 and 40 are of resilient character and are pivotally mounted with respect to one another so that they may spring apart sufficiently to permit bolt 23 to assume the position shown in Fig. 1. By reason of this locking action, body member 12 may be released for rotation only when the weight 21 slides in one direction or the other out of the latch 38.

In order to show the operation of the latch mechanism, Figs. 3 to 13 show a simplified latch member 38a whereby weight 21 is unlatched in response to acceleration or deceleration forces.

In operation, it may be assumed that the body member 12 is in the position indicated in Fig. 3 with the bolt 23 extending into locked relation with the latch 38a. It may be assumed that the arms 10 rotate in a clockwise direction so that the centrifuge may be started and create forces of inertia on the sliding weight 21. This will cause weight 21 to move to an unlatched position shown in Fig. 4. Movement of weight 21 to this position unbalances the body member 12, causing it to rotate and/or index through the position shown in Fig. 5 to the position shown in Fig. 6. With the body member in this position, forces of acceleration, for example, may be simulated with respect to the part 19 which is being tested.

When the acceleration simulating cycle is complete, the centrifuge may be decelerated at which time the unbalance in body member 12 will cause it to rotate and/or index through the position shown in Fig. 7 into the position shown in Fig. 8 with weight 21 latched by latch 38a. When the centrifuge is again accelerated up to its full testing speed, the weight 21 will assume the unlatched position shown in Fig. 9, thereby creating unbalance on the opposite side of the body member 12. This causes the body member 12 to rotate and/or index through the position shown in Fig. 10 into the position shown in Fig. 11. In this manner, the direction of centrifugal force on the device 19, which is being tested, is reversed thereby simulating forces of deceleration on the device 19.

When the centrifuge has operated through this portion of the testing cycle, it may be decelerated to cause the unbalance of member 12 to rotate and/or index member 12 through the position shown in Fig. 12 into the latching position shown in Fig. 13. In this manner, the body member 12 has been caused to rotate through 360° of rotation back to its original position illustrated in Fig. 3.

From the foregoing description, it will be apparent that this invention provides a means of automatically applying test forces to an object in different directions simply by accelerating and decelerating a centrifuge.

The invention claimed is:

1. A test fixture adapted to cooperate with a centrifuge having a rotating arm and comprising a body portion having a first cavity for supporting a device for testing and a second cavity extending transversely of the axis of rotation of said body portion and in a plane parallel to the forces of acceleration and deceleration, bearing means for rotatably mounting said body portion in said rotating arm, and means for indexing said body portion in response to accelerative and decelerative forces comprising a weight slidably supported for movement between two off-center positions in said second cavity and including bolt portions, and latch means cooperating with said arm and said bolt portions normally to hold said body portion in a starting position with said weight off-center in the direction of rotation of said arm and with respect to the axis of rotation of said body portion.

2. A test fixture adapted to cooperate with a centrifuge having a rotating arm and comprising a body portion having a cavity for supporting a device in a fixed position for testing, bearing means for rotatably mounting said body portion in said rotating arm, means for indexing said body portion in response to accelerative and decelerative forces comprising a weight slidably supported transversely of the axis of rotation of said body portion for movement between two off-center positions and in a plane parallel to the direction of said forces, said weight including bolt portions, and latch means cooperating with said arm and said bolt portions normally to hold said body portion in a starting position with said weight off-center in the direction of rotation of said arm and with respect to the axis of rotation of said body portion.

3. A test fixture adapted to cooperate with a centrifuge having a rotating arm and comprising a body portion for supporting a device for testing, bearing means for rotatably mounting said body portion in said rotating arm, means for indexing said body portion in response to accelerative and decelerative forces comprising a weight slidably supported transversely of the axis of rotation of said body portion for movement between two off-center positions and in a plane parallel to the direction of said forces, and latch means cooperating with said arm and said body portion normally to hold said body portion in a starting position with said weight off-center in the direction of rotation of said arm and with respect to the axis of rotation of said body portion.

4. A test fixture adapted to cooperate with a centrifuge having a rotating arm comprising a body portion for supporting a device for testing, bearing means for rotatably mounting said body portion in said rotating arm, said body portion including means for unbalancing said body portion and indexing said body portion to a first position in response to accelerative forces and to a second position in response to decelerative forces, and latch means cooperating with said arm and said body portion normally to hold said body portion in a starting position corresponding to said second position with said unbalancing means in unbalancing relation with respect to said body portion.

5. A test fixture adapted to cooperate with a centrifuge having a rotating arm comprising a body portion for supporting a device for testing, and bearing means for rotatably mounting said body portion in said rotating arm, said body portion including means for indexing said body portion to a first position in response to accelerative forces and to a second position in response to decelerative forces.

References Cited in the file of this patent

UNITED STATES PATENTS

| | | |
|---|---|---|
| 443,695 | Copeland | Dec. 30, 1890 |
| 2,465,437 | Engelhardt | Mar. 29, 1949 |
| 2,645,130 | Chamberlain et al. | July 14, 1953 |
| 2,799,163 | Armstrong | July 16, 1957 |
| 2,817,970 | Whitby | Dec. 31, 1957 |

OTHER REFERENCES

Publication: Instruments and Automation, "Testing With A G-Accelerator," by R. Brown, September 1955, pages 1513–1515.